July 7, 1959

J. V. SHERIDAN ET AL 2,893,479

TIRE TRUING DEVICE COMPRISING HYDRAULICALLY
OPERATED TIRE SUPPORT AND ADJUSTABLE
CAM OPERATED CUTTING TOOL

Filed Nov. 19, 1956

INVENTOR.
JAMES V. SHERIDAN
ORVAL M. LEWIS
BY
ATTORNEY

July 7, 1959
J. V. SHERIDAN ET AL
2,893,479
TIRE TRUING DEVICE COMPRISING HYDRAULICALLY OPERATED TIRE SUPPORT AND ADJUSTABLE CAM OPERATED CUTTING TOOL
Filed Nov. 19, 1956
3 Sheets-Sheet 2
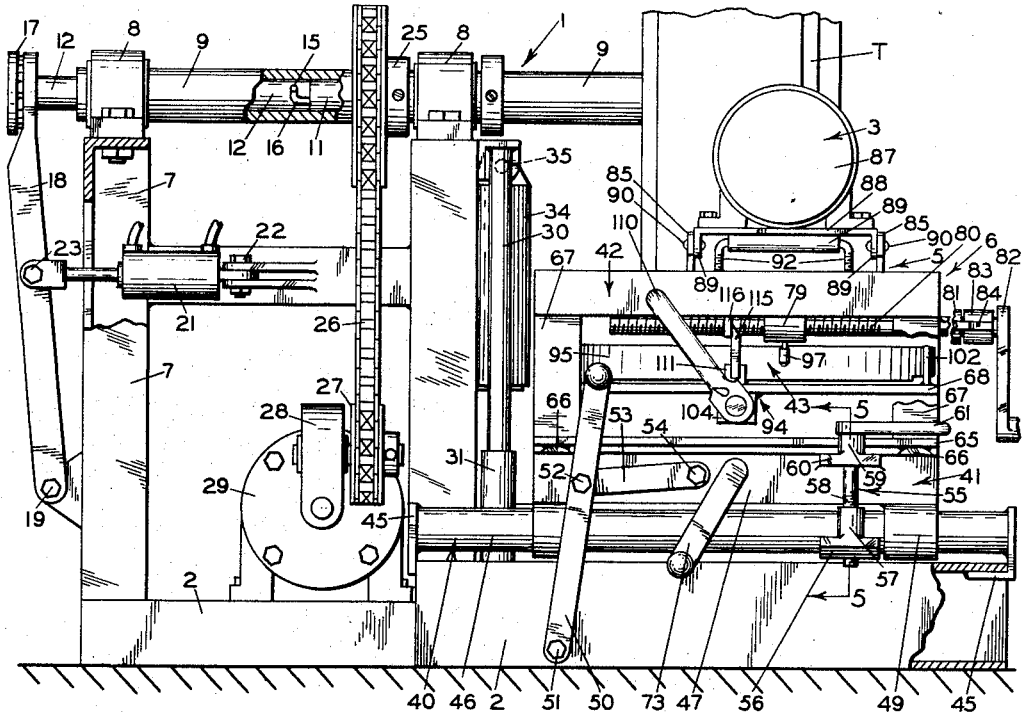
Fig. 2
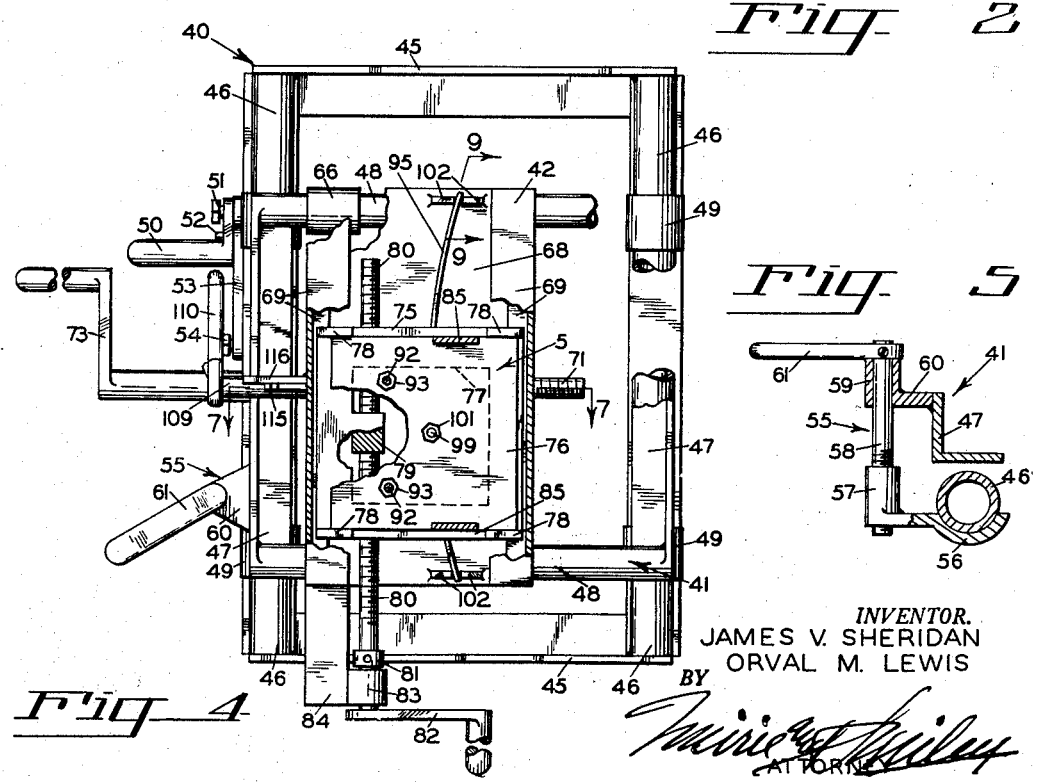
Fig. 4
Fig. 5
INVENTOR.
JAMES V. SHERIDAN
ORVAL M. LEWIS
BY
ATTORNEY July 7, 1959
J. V. SHERIDAN ET AL
2,893,479
TIRE TRUING DEVICE COMPRISING HYDRAULICALLY
OPERATED TIRE SUPPORT AND ADJUSTABLE
CAM OPERATED CUTTING TOOL
Filed Nov. 19, 1956
3 Sheets-Sheet 3
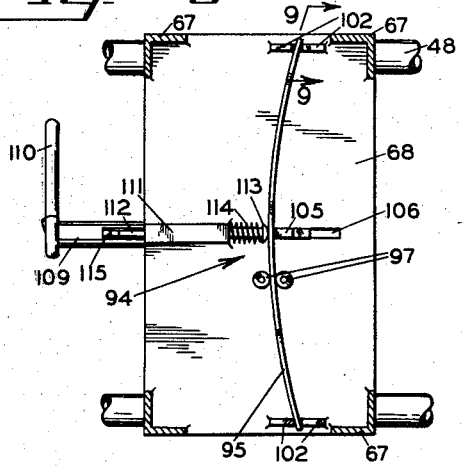
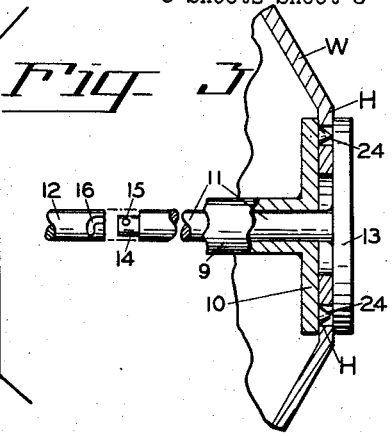
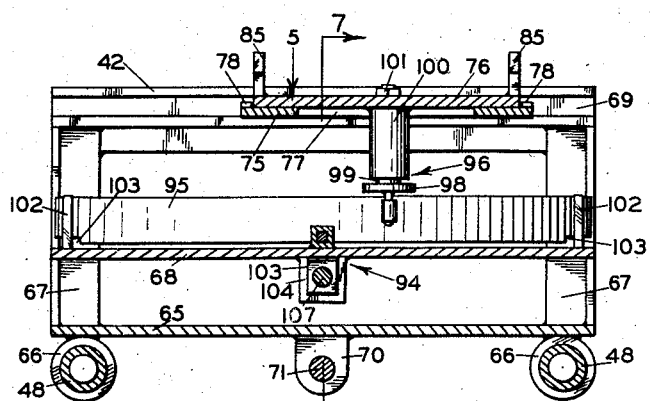
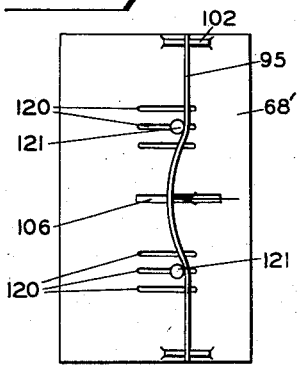
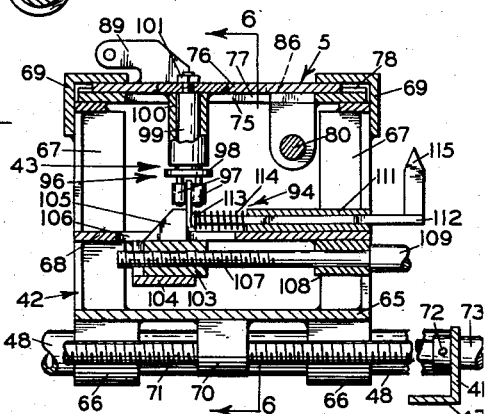
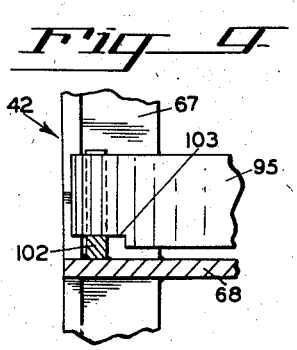
INVENTOR.
JAMES V. SHERIDAN
ORVAL M. LEWIS
BY
ATTORNEY United States Patent Office 2,893,479
Patented July 7, 1959

2,893,479

TIRE TRUING DEVICE COMPRISING HYDRAULICALLY OPERATED TIRE SUPPORT AND ADJUSTABLE CAM OPERATED CUTTING TOOL

James V. Sheridan and Orval M. Lewis,
Sweet Home, Oreg.

Application November 19, 1956, Serial No. 623,207

13 Claims. (Cl. 157—13)

This invention relates to tire truing machines and more particularly to such machines for truing the tread on large truck tires and the like.

The primary object of the invention is to provide a truing machine having means for readily and easily positioning and securing a wheel and tire in operative position.

Another object of the invention is to provide a tire truing machine having a cutter mounted for compound movement toward or from and transversely of the tread of a tire.

Still another object of the invention is to provide a tire truing machine having means for moving the cutter through a path of selected, predetermined contour.

A further object of the invention is to provide a tire truing machine having means for adjustably positioning the cutter carriage and moving the carriage transversely of the tire tread by a relatively quick adjustment and toward and from the tire tread by a relatively accurate and slow adjustment.

A still further object of the invention is to provide a tire truing machine having simplicity of design, economy of construction and efficiency in operation.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings wherein like reference characters indicate like parts through the several figures and in which:

Figure 2 is a side view in elevation of the apparatus shown in Figure 1, parts being broken away for convenience of illustration;

Figure 3 is an enlarged fragmentary cross-sectional view taken on line 3—3 of Figure 1;

Figure 4 is a cross-sectional view taken on line 4—4 of Figure 1, parts being broken away for convenience of illustration;

Figure 5 is an enlarged fragmentary cross-sectional view taken on line 5—5 of Figure 2;

Figure 6 is a cross-sectional view taken on line 6—6 of Figures 1 and 7;

Figure 7 is a cross-sectional view taken on line 7—7 of Figures 4 and 6;

Figure 8 is a cross-sectional view taken on line 8—8 of Figure 1;

Figure 9 is an enlarged fragmentary cross-sectional view taken on line 9—9 of Figures 4 and 8; and Figure 10 is a plan view similar to Figure 8 and illustrating a modification.

Figure 1:
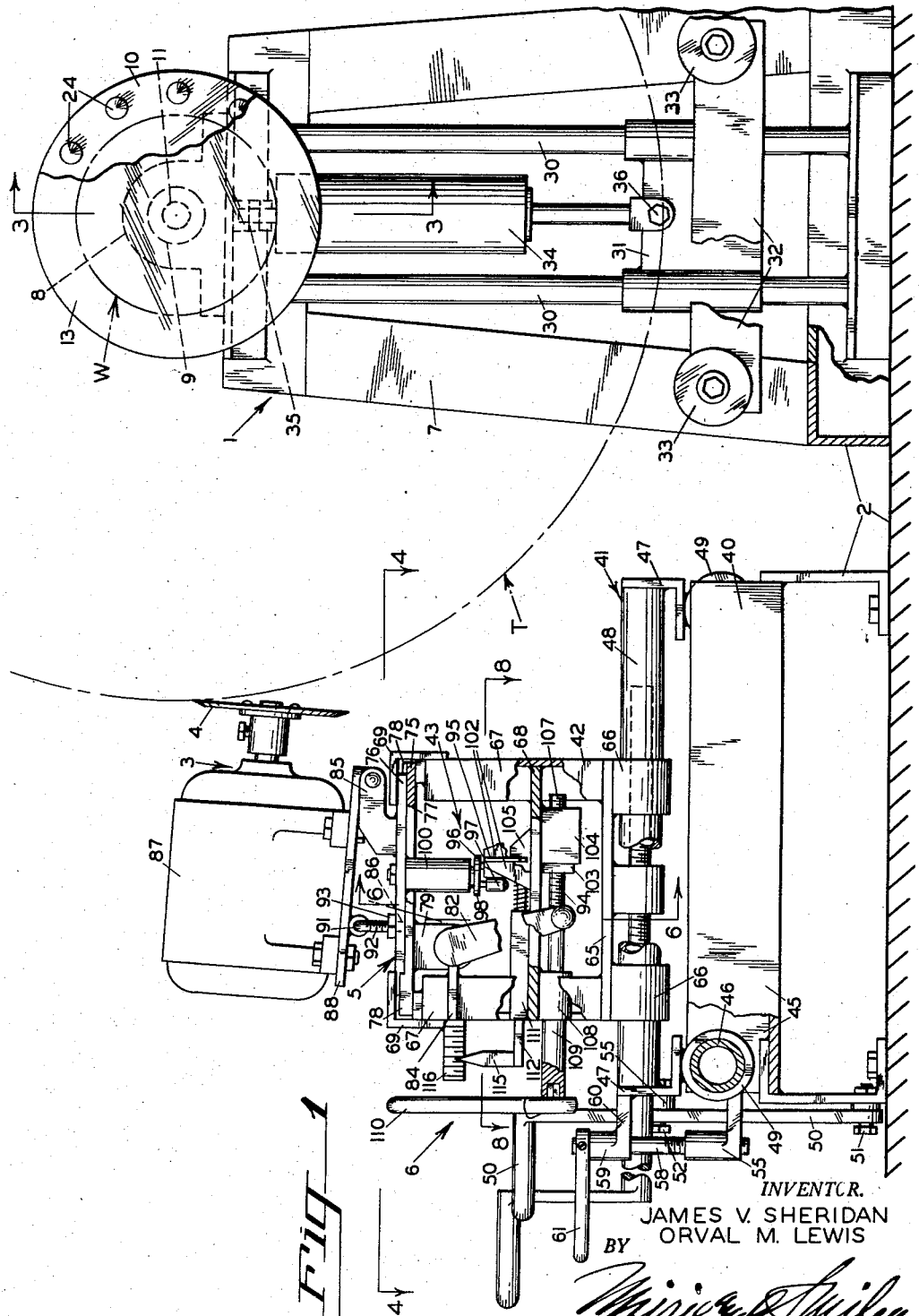
Figure 1 is an end view in elevation of a tire truing apparatus in accordance with the present invention, the wheel and tire being illustrated by broken lines, and parts being broken away for convenience of illustration.

Referring now to the drawings, specifically to Figs. 1 and 2, a tire truing apparatus in accordance with the present invention comprises a wheel supporting pedestal 1 mounted on a base 2, and a tire trimming apparatus including a tire trimming device 3 having a tire trimming knife 4, a carriage 5 movably supporting the trimming device 3, and an adjustable support 6 mounted on the base 2 and supporting the carriage 5. The pedestal 1 is adapted to rotatably support and drive a wheel W on which is mounted a tire T, and the knife 4 is adapted to be positioned to engage the periphery of the tire T by adjustment of the support 6 and to be moved transversely of the tire T by the carriage 5, such movement corresponding to the transverse curvature of the tread of the tire T.

The wheel supporting pedestal 1 comprises an upstanding frame 7 on which is mounted a pair of spaced bearings 8 within which is journaled a wheel supporting tubular shaft 9 that terminates at its forward or wheel supporting end in a radial flange 10, as shown in Figs. 1 and 3. A pair of shafts 11 and 12 are slidably and rotatably mounted in the tubular shaft 9, as shown in Figs. 2 and 3, these shafts 11 and 12 having a combined length slightly greater than the tubular shaft 9. At its outer end, the shaft 11 is provided with a disc 13 corresponding to the flange 10 on the tubular shaft 9 and at its inner end the shaft 11 is provided with a reduced end 14 having at least one radial pin 15. The inner end of the shaft 12 is socketed to receive the reduced end 14 and provided with a bayonet slot 16 for receiving the pin 15 to secure the shafts 11 and 12 together, and the outer end of the shaft 12 has a thrust bearing 17 fixed thereto.

A lever 18 is mounted at one end by a pivot 19 on the frame 7 and the other end 20 of the lever 18 is connected with the thrust bearing 17 as by the usual yoke arrangement which straddles the bearing 17 for imparting axial thrust thereto while permitting relative rotation. A fluid operated jack 21 is mounted at one end by a pivot 22 on the frame 7 and connected at the other end by a pivot 23 to the lever 18 intermediate its ends. The jack 21 is provided with the usual fluid pressure lines (not shown) for operating it to swing the lever 18 on its pivot 19 to impart axial movement to the shaft 12.

The wheel W is adapted to be clamped between the flange 10 and disc 13, as shown in Fig. 3, and to accurately position the wheel, one of said clamp members, preferably the flange 10, is provided with dowel pins or conical lugs 24 which correspond in the relative positions to at least some of the bolt or lug holes H in the wheel W. A sprocket 25 is fixed on the tubular shaft 9 and is connected by a chain 26 with a sprocket 27 driven by a reduction unit 28 from a motor 29 mounted on the base 2.

At the forward or wheel supporting end, the frame 7 is provided with a pair of parallel, vertically disposed guide rods 30 upon which is slidably mounted a crosshead 31 carrying a crossbar 32 which rotatably supports a pair of tire supporting rollers 33 which are uniformly spaced on opposite sides of the vertical plane passing through the axis of the tubular shaft 9. A fluid operated jack 34 is mounted at its upper end by a pivot 35 on the frame 7 and at its lower end is connected by a pivot 36 to the cross-head 31. The jack is provided with the usual fluid pressure lines (not shown) for operating it to raise and lower the cross-head 31.

To mount a tire and wheel on the pedestal 1, the jack 21 is operated to pull the lever 18 and move the shafts 12 and 11 forwardly through the tubular shaft 9. The operator then grasps the disc 13 and turns it to rotate the shaft 11 relative to the shaft 12 and release the pin 15 from the bayonet slot 16. The operator then withdraws the shaft 11 from the tubular shaft 9. Next, the jack 34 is operated to lower the cross-head 31 so that a wheel and tire may be rolled or positioned on the rollers 33 after which the jack 34 is again actuated to lift the cross-head until the wheel W is axially aligned with the disc 10. The wheel W is then rotated on the rollers 33 to register the bolt or lug holes H with the dowels or lugs 24. The shaft 11 is then inserted in the tubular shaft 9, the reduced end 14 of said shaft 11 being nested in the socketed end of the shaft 12 and turned relative to each other to secure the pin 15 in the bayonet slot 16. The jack 21 is then actuated to push the lever 18 and pull the shafts 12 and 11 to press the disc 13 tightly against the wheel W and clamp the wheel against the flange 10. The jack 34 is then actuated to lower the cross-head 31 and remove the rollers 33 from the tire. The tire T is then in position for the trimming operation upon energization of the motor 29 to drive the tubular shaft 9 and the wheel W supported thereby.

Turning now to the tire trimming apparatus, the adjustable support 6, as best shown in Figs. 1, 2 and 4, comprises, briefly, a base frame 40 mounted on the base 2 and slidably supporting an intermediate frame 41 for movement substantially parallel with the axis of the wheel supporting shaft 9. The intermediate frame 41, in turn, slidably supports a supplemental frame 42 for movement substantially parallel with the plane of the tire T and perpendicular to the path of movement of the intermediate frame 41.

The supplemental frame 42 slidably supports the carriage 5 which is capable of a compound movement so that the trimming device 3 and knife 4 may be moved both toward or away from the tire T, that is, in the plane of the tire, as well as transversely of the tire T and axially of the wheel supporting shaft 9. The carriage 5 is guided through its compound movement by an adjustable guide mechanism 43 between the carriage 5 and the supplemental frame 42.

Specifically, the base frame 40 comprises a pair of spaced end members 45 mounted on the base 2 and supporting between them a pair of spaced, parallel rails 46, preferably of cylindrical section, and substantially parallel with the axis of the wheel supporting tubular shaft 9. The intermediate frame 41 comprises a pair of spaced end members 47 and supporting between them a pair of spaced, parallel rails 48 preferably also of cylindrical section and disposed at right angles to the axis of the wheel supporting shaft 9 and substantially parallel with the tire T. Each of the end members 47 is fixed on a slide means 49, preferably constituted by a pair of spaced collars slidably mounted respectively on one of the base frame rails 46 so that the intermediate frame 41 is movable in a path substantially parallel with the wheel supporting shaft 9 and transversely of the tire T.

The intermediate frame 41 is slid along the rails 46 by a lever 50 which is mounted at its lower end by a pivot 51 on the base 2 and is connected intermediate its length by a pivot 52 to a link 53 which, in turn, is connected by a pivot 54 to one of the end members 47. The intermediate frame 41 is secured in adjusted position by a clamp device 55 which, as best shown in Fig. 5, includes a clamp element 56 of arcuate contour crresponding to and engaging the underside of one of the rails 46 and having an internally threaded, vertically disposed collar 57. A bolt or threaded shank 58 is threaded in the collar 57 and is journalled in an upstanding sleeve 59 carried by a bracket 60 fixed on one of the end members 47. The shank 58 is retained in the sleeve 59 and is also rotated by a handle 61 fixed to the upper end thereof and bearing on the upper end of the sleeve 59.

The supplemental frame 42 comprises a base plate 65 mounted at each end on a slide means 66 preferably constituted by a pair of spaced collars, slidably mounted respectively on one end of the rails 48 of the intermediate frame 41 so that the supplemental frame 42 is slidable toward and from the tire T at right angles to the axis of the wheel supporting shaft 9. Upstanding corner posts 67 are mounted on the base plate 65 and intermediate their height, support a second plate 68 spaced above and parallel with the base plate 65. At their upper ends the corner posts 67 support a pair of spaced parallel rails 69 of channel formation and disposed with their channels in facing relation, as best shown in Figs. 1, 6 and 7. The carriage 5, which supports the triming device 3, is slidably mounted within the channel rails 69 which are arranged substantially parallel to the tubular shaft 9. Movement of the supplemental frame 42 along the rails 48, toward or from the tire T, is effected by an internally threaded lug 70 fixed to and depending from the base plate 65, and a screw 71 threaded in said lug 70 and journalled in fixed axial relation in one of the end members 47 of the intermediate frame 41 by a collar 72 and a crank 73 fixed on the outer end of said screw 71, as best shown in Fig. 7.

The carriage 5 comprises two plates 75 and 76 slidable one on top of the other and both slidable in the channels of the rails 69. The lower plate 75 comprises a rectangular frame having an opening 77 and is substantially the same width as the spacing between the bases of the rail channels 69 and slidably rests on the lower flanges of said channel rails for movement longitudinally of said rails 69. The plate or frame 75 has upstanding flanges 78 at its opposite ends, these flanges 78 being shown as lugs at each corner. The flanges or lugs 78 run perpendicular to the rails 69 and are of a height, combined with the thickness of the plate 75, less than the spacing between the flanges of the channel rails 69. The frame 75 is moved longitudinally of the rails 69 by means of an internally threaded lug 79 fixed thereto and depending therefrom, and a screw 80 threaded in said lug 79 and journalled by a collar 81 and crank 82 in a bearing 83 carried by a bracket 84 fixed on one of the corner posts 67.

The upper plate 76 of the carriage 5 is of a length to fit slidably on the plate frame 75 between the upstanding flanges 78 and the width of the upper plate 76 is somewhat less than the spacing of the bases of the channel rails 69 so that the plate 75 is slidable across the frame 75 perpendicularly of the rails 69 as well as longitudinally of the rails 69 with the frame 75. The plate 76 carries a pair of spaced, upstanding, apertured ears 85 respectively adjacent its ends and this plate has a pair of bolt holes 86, Figs. 1 and 7, spaced longitudinally and uniformly with respect to the transverse center line of said plate and within the area of the opening 77 in the under plate frame 75.

The trimming knife 4 preferably is a rotary disc knife and the trimming device 3 comprises a motor 87 preferably having the knife 4 fixed directly on its rotor shaft, as shown. The motor 87 is mounted on a base plate 88 having adjacent its forward edge a pair of downturned ears 89, Fig. 2, which respectively coincide with and are mounted to the ears 85 by pivots 90. Spaced rearwardly from the ears 89 is a sleeve 91 fixed to the underside of the base plate 88 parallel with the axis of the pivots 90. Angle bolts 92, forming adjustable legs, each have one end inserted in the respective ends of the sleeve 91 and the other end inserted in the respective bolt hole 86 in the upper carriage plate 76. The bolts or legs 92 are secured at selected elevation relative to the plate 76 by the usual lock nuts 93, whereby to position the trimming knife 4 at the desired angle relative to the tread of the tire T.

The adjustable guide mechanism 43 for guiding the knife 4 through its path relative to the tire T, as best shown in Figs. 6, 7 and 8, comprises an adjustable cam mechanism 94, including an adjustable cam 95, carried by the supplemental frame 42, and a follower mechanism 96, including a pair of cam follower rollers 97 straddling the cam 95, carried by the carriage 5, specifically the upper plate 76 of the carriage 5. The cam 95 comprises a relatively thin, spring strip or bar that is disposed on edge on and longitudinally of the second plate 68 of the supplemental frame 42 and may be deformed to a desired contour. The follower rollers 97 engage the opposite sides of the cam 95 and are rotatably carried on parallel axes by a cross-head 98 carried above the cam 95 by a spindle 99 journalled in a pedestal or sleeve 100 depending from the plate 76, on the transverse center line and secured to said plate by a nut 101. Thus, the follower rollers 97, cross-head 98 and spindle 99 may turn within the sleeve 100 according to the curvature of the cam 95.

To enable adjustable curvature or contouring of the cam 95, it is loosely supported at its ends by upstanding U-shaped brackets 102 on the second base plate 68, the lower corners of the cam 95 having notches 103 which provide abutments for engaging the brackets 102 to limit longitudinal movement of the cam 95 relative to the brackets 102 so that the ends of the cam cannot be moved longitudinally sufficiently to free the ends of the cam from the respective brackets. To adjust the curvature or contour of the cam 95 to correspond to the desired transverse curvature of the tread of the tire T, the cam mechanism 94 comprises a nut 103 slidably mounted transversely and centrally of the second plate 68 in a slideway or sleeve 104 secured to the underside of the plate 68, said nut 103 carrying an abutment 105 which extends upwardly through a slot 106 in the plate 68 and engages one side of the cam bar 95.

A screw 107 is threaded in the nut 103 and is journalled in a bearing 108 secured to the underside of the plate 68, said screw 107 having a wrench end 109 abutting the outer end of the bearing 108 and retained thereagainst by the reaction of the cam bar 95. A wrench 110 is adapted for removable engagement with the end 109 for turning the screw 107. To enable accurate adjustment of the cam 95, a sleeve 111 is mounted on the plate 68 in alignment with the slot 106 and a rod 112 is slidably mounted in said sleeve 111, the inner end of the rod carrying an abutment 113 for engaging the cam 95 opposite the abutment 105 and retained thereagainst by a spring 114 interposed between the abutment 113 and the inner end of the sleeve 111. A pointer 115 is carried on the outer end of the rod 112 in cooperative relation with a scale 116 carried by the intermediate frame 42.

If it is desired to provide a greater adjustment of the radius of curvature or a variable contour to the tire tread, a modified cam positioning mechanism may be employed, such as that shown in Fig. 10. According to this modification, a second plate 68' is provided with a plurality of slots 120 arranged in pairs uniformly spaced on opposite sides of and parallel with the central slot 106. Stops or abutments 121 are adjustably clamped in selected slots 120 for engagement with the side of the cam bar 95 opposite the adjusting abutment 105 and thereby limit the area and radius of curvature of the cam 95 by the abutment 105.

In the operation of the trimming apparatus, the curvature or contour of the cam 95 is adjusted in accordance with the desired transverse contour of the tread of the tire T to be trimmed. This adjustment is effected by applying the wrench 110 to the wrench end 109 and turning the screw 107 to thread the nut 103 therealong to move the abutment 105 along the slot 106 and bow the cam bar 95 to the desired degree which will be registered by the pointer 115 on the scale 116. The lever 50 is then swung to slide the intermediate frame 41 along the base frame 40 to center the intermediate frame 41 and supplemental frame 42 relative to the tread of the tire T on the pedestal 1, as shown in Fig. 2. After the proper positioning of the intermediate frame 41, it is secured by swinging the handle 61 to turn the threaded rod 58 to draw up the clamp 56 against the rail 46 of the base frame 40.

The crank 82 is then operated to turn the screw 80 and move the carriage 5 along the rails 69 to one end of the supplemental carriage 42 so that the knife 4 will be positioned laterally of the tire T. The angle of the knife 4 is adjusted, if desired, by adjustment of the lock nuts 93 to raise or lower the legs or angle bolts 92 relative to the upper plate 76 of the carriage 5 to swing the motor base plate 88 on its pivots 90. The supplemental frame 42 is then adjusted on the rails 48 of the intermediate frame 41 toward or from the tire T by operation of the crank 73 to turn the screw 71, thereby spacing the knife 4 the desired distance from the rotary axis of the tire T. The trimming apparatus is now ready for the trimming operation.

To effect the trimming of the tread of the tire T, the motor 29 of the pedestal 1 is energized to drive the wheel supporting shaft 9 and rotate the wheel W and tire T. The motor 87 of the trimming device 3 is also energized to drive the rotary disc knife 4. The crank 82 is then operated to turn the screw 80 which causes the follower 79 to thread therealong and move the carriage 5 along the rails 69 of the supplemental frame 42. As the carriage 5 is moved along the rails 69, the follower rollers 97 of the follower mechanism 96 depending from the upper carriage plate 76 are moved longitudinally of and follow the curvature or contour of the cam bar 95. As a result, the upper carriage plate 76 is carried longitudinally of the rails 69, or transversely of the tire T, by the lower carriage plate 75, and said upper plate 76 is also simultaneously moved by the follower mechanism 96 along the guide flanges 78 of the lower carriage plate 75 so that the upper plate 76 is moved transversely of the rails 69 and lower plate 75 or toward or from the tire T so as to provide the desired transverse curvature or contour to the tread of the tire T.

Although a certain specific embodiment of the invention has been shown and described, it is obvious that many modifications thereof are possible. The invention, therefore, is not to be restricted except insofar as is necessitated by the prior art and by the spirit of the appended claims.

That which is claimed as new is:

1. A tire truing apparatus comprising a base, a wheel supporting pedestal on said base; means for removably mounting a wheel and tire on said pedestal and comprising a tubular shaft journaled on said pedestal, a radial annular flange on one end of said shaft, a plurality of spaced dowels on the outer face of said flange and disposed in a circle concentric with the axis of said shaft for mating in the bolt or lug holes of a wheel, an inner shaft removably mounted in said tubular shaft, a disc on the outer end of said inner shaft and corresponding substantially with said annular flange, and means for releasably securing said inner shaft in said tubular shaft to clamp a wheel between said annular flange and said disc; and a tire trimming apparatus including an adjustable support mounted on said base laterally of said pedestal and substantially aligned with the periphery of a wheel mounted on said pedestal, a carriage slidably mounted on said adjustable support, a trimming device mounted on said carriage and including a knife for trimming the tread of a tire on a wheel mounted on said pedestal, and means for moving said carriage to move said trimming knife transversely of the tire tread and imparting a compound movement thereto corresponding to the desired transverse contour of the tread of the tire; drive means connected with said tubular shaft for rotating a wheel supported by said mounting means; means on said pedestal for raising or lowering a wheel and tire relative to said mounting means; said means for releasably securing said inner shaft in said tubular shaft comprising a second inner shaft slidably mounted in said tubular shaft and extending beyond the end of said tubular shaft opposite said flange, means for releasably securing the inner ends of said inner shafts together, and means on the outer end of said second inner shaft for sliding said inner shafts longitudinally within said tubular shaft for moving said disc toward or away from said annular flange to release or clamp a wheel between said flange and disc.

2. A tire truing apparatus as set forth in claim 1 wherein said means for moving said second inner shaft comprises a thrust bearing axially fixed on the outer end of said second inner shaft, a lever pivotally mounted on said pedestal and connected to said lever for swinging said lever to move said second inner shaft.

3. A tire truing apparatus as set forth in claim 2 wherein said lever swinging means comprises a fluid operated jack.

4. A tire truing apparatus as set forth in claim 3 comprising a support vertically slidable on said pedestal below said annular flange, a pair of rollers journalled on said support equidistant from the vertical passing through the axis of said flange for supporting a wheel and tire, and a fluid operated jack connected with said support for moving said support to lift or lower a wheel and tire relative to said flange.

5. A tire truing apparatus comprising a base, a wheel supporting pedestal on said base; means for removably mounting a wheel and tire on said pedestal, means for rotating a wheel mounted on said pedestal, and a tire trimming apparatus including an adjustable support mounted on said base laterally of said pedestal and substantially aligned with the periphery of a wheel mounted on said pedestal, a carriage slidably mounted on said adjustable support, a trimming device mounted on said carriage and including a knife for trimming the tread of a tire on a wheel mounted on said pedestal, and means for moving said carriage to move said trimming knife transversely of the tire tread and imparting a compound movement thereto corresponding to the desired transverse contour of the tread of the tire; said adjustable support comprising an intermediate frame adjustably mounted on said base for movement along a path parallel with the axis of a wheel and tire mounted on said pedestal, and a supplemental frame adjustably mounted on said intermediate frame for movement along a path perpendicular to the wheel axis, said carriage being slidably mounted on said supplemental frame.

6. A tire truning apparatus as set forth in claim 5 wherein said carriage comprises two members one slidable on the other, with the upper member supporting said trimming device, the lower member being slidable on said supplemental frame along a path parallel with the wheel axis, said upper member being carried by said lower member for movement therewith and said upper member being slidable on said lower member along a path perpendicular to the wheel axis, and guide means between said upper member and said supplemental frame as said lower member is moved on said supplemental frame to impart a compound movement to said upper member and trimming device corresponding to the transverse contour of the tread of a tire.

7. A tire truning apparatus as set forth in claim 6 wherein said guide means comprises a flexible cam bar mounted on said supplemental frame longitudinally of the path of said lower carriage member, means on said supplemental frame for flexing said cam bar to bend it into a contour corresponding to the desired contour to the tire thread, and follower means carried by said upper carriage member and engaged with said cam bar.

8. A tire truning apparatus as set forth in claim 7 wherein said trimming device comprises a motor, said knife comprising a disc knife mounted on the shaft of said motor, a base plate supporting said motor and pivotally mounted adjacent one edge on said upper carriage member, and adjustable legs between said upper member and base plate and spaced from said pivotal mounting for varying the angle of said knife relative to the tire tread.

9. A wheel supporting pedestal for a tire truing apparatus comprising an upright frame, a horizontal shaft journaled on said frame, means for removably mounting a wheel and tire on said shaft, means for driving said shaft to rotate the wheel and tire, and means on said frame for lifting or lowering a wheel and tire to or from said wheel mounting means, said shaft including a tubular shaft and said wheel mounting means comprising a radial annular flange on one end of said shaft, a plurality of spaced dowels on the outer face of said flange and disposed in a circle concentric with the axis of said shaft for mating in the bolt or lug holes of a wheel, an inner shaft removably mounted in said tubular shaft, a disc on the outer end of said inner shaft and corresponding substantially with said annular flange, and means for releasably securing said inner shaft in said tubular shaft to clamp a wheel between said annular flange and said disc, and said means for releasably securing said inner shaft in said tubular shaft comprising a second inner shaft slidably mounted in said tubular shaft and extending beyond the end of said tubular shaft opposite said flange, means for releasably securing the inner ends of said inner shafts together, and means on the outer end of said second inner shaft for sliding said inner shafts longitudinally within said tubular shaft for moving said disc toward or away from said annular flange to release or clamp a wheel between said flange and disc.

10. A wheel supporting apparatus as set forth in claim 9 wherein said means for moving said second inner shaft comprises a thrust bearing axially fixed on the outer end of said second inner shaft, a lever pivotally mounted on said frame and connected to said thrust bearing, and a fluid operated jack mounted on said pedestal and connected to said lever for swinging said lever to move said second inner shaft.

11. A wheel supporting pedestal as set forth in claim 10 comprising a support vertically slidable on said frame below said annular flange, a pair of rollers journalled on said support equidistant from the vertical passing through the axis of said flange for supporting a wheel and tire, and a fluid operated jack connected between said frame and said support for moving said support to lift or lower a wheel and tire relative to said flange.

12. A trimming apparatus for tire truing machine comprising a base, an adjustable support mounted on said base and substantially aligned with the periphery of a wheel rotatably mounted on said base, a carriage slidably mounted on said adjustable support, a trimming device mounted on said carriage and including a knife for trimming the tread of a tire on the wheel, and means for moving said carriage to move said trimming knife transversely of the tire tread said adjustable support comprises an intermediate frame adjustably mounted on said base for movement along a path parallel with the axis of a wheel and tire mounted on said base, and a supplemental frame adjustably mounted on said intermediate frame for movement along a path perpendicular to the wheel axis, said carriage including two members one slidable on the other, with the upper member supporting said trimming device, the lower member being slidable on said supplemental frame along a path parallel with the wheel axis, said upper member being carried by said lower member for movement therewith and said upper member being slidable on said lower member along a path perpendicular to the wheel axis, and guide means between said upper member and said supplemental frame as said lower member is moved on said supplemental frame to impart a compound movement to said upper member and trimming device corresponding to the transverse contour of the tread of a tire.

13. A trimming apparatus as set forth in claim 12 wherein said guide means comprises a flexible cam bar mounted on said supplemental frame longitudinally of the path of said lower carriage member, means on said supplemental frame for flexing said cam bar to bend it into a contour corresponding to the desired contour to the tire tread, and follower means carried by said upper carriage member and engaged with said cam bar.

References Cited in the file of this patent
UNITED STATES PATENTS

| | | |
|---|---|---|
| 2,183,376 | Wikle | Dec. 12, 1939 |
| 2,200,575 | Haskins | May 14, 1940 |
| 2,243,461 | Haskins | May 27, 1941 |
| 2,601,810 | James | July 1, 1952 |